United States Patent
Lavoie et al.

(10) Patent No.: US 8,301,662 B2
(45) Date of Patent: *Oct. 30, 2012

(54) SUB-MAILBOX FOLDER HIERARCHY TO REPRESENT A SEPARATE PHYSICAL MAILBOX TO A USER

(75) Inventors: Lauren B. Lavoie, Seattle, WA (US); Karim M. Batthish, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 243 days.

This patent is subject to a terminal disclaimer.

(21) Appl. No.: 12/414,686

(22) Filed: Mar. 31, 2009

(65) Prior Publication Data

US 2010/0250567 A1 Sep. 30, 2010

(51) Int. Cl.
*G06F 17/30* (2006.01)
(52) U.S. Cl. ............... 707/796; 709/206; 715/752
(58) Field of Classification Search .......... 707/796
See application file for complete search history.

(56) References Cited

U.S. PATENT DOCUMENTS

| | | | |
|---|---|---|---|
| 6,393,463 B1* | 5/2002 | Fuchigami | 709/206 |
| 6,526,413 B2* | 2/2003 | Schwitters et al. | 707/621 |
| 7,080,104 B2* | 7/2006 | Ring et al. | 707/999.203 |
| 7,155,725 B1* | 12/2006 | Kister et al. | 719/310 |
| 7,720,920 B2* | 5/2010 | Singh et al. | 709/206 |
| 8,108,469 B2* | 1/2012 | Kent et al. | 709/206 |
| 2002/0049801 A1 | 4/2002 | Beynon et al. | |
| 2002/0174194 A1* | 11/2002 | Mooney et al. | 709/219 |
| 2003/0231207 A1* | 12/2003 | Huang | 715/752 |
| 2004/0068544 A1* | 4/2004 | Malik et al. | 709/206 |
| 2007/0014300 A1* | 1/2007 | Breuer et al. | 370/401 |
| 2007/0028293 A1* | 2/2007 | Boerries et al. | 726/2 |
| 2007/0100856 A1 | 5/2007 | Ebbesen | |
| 2008/0126353 A1* | 5/2008 | Baude et al. | 707/10 |
| 2008/0177845 A1 | 7/2008 | Bracewell et al. | |
| 2008/0270547 A1 | 10/2008 | Glickstien et al. | |
| 2010/0145932 A1* | 6/2010 | Rook et al. | 707/722 |
| 2010/0161737 A1* | 6/2010 | Consul et al. | 709/206 |

FOREIGN PATENT DOCUMENTS

WO   WO 2009116054 A2 * 9/2009

OTHER PUBLICATIONS

Microsoft Computer Dictionary, 5th ed. (2002), pp. 41 ("archive") & 433 ("mirroring").*

(Continued)

*Primary Examiner* — Cheryl Lewis
*Assistant Examiner* — Scott A Waldron

(57) ABSTRACT

Architecture that provides an abstraction of a mailbox store that allows clients to connect to multiple "alternate" mailboxes associated with a single user, exposing the same mechanism used to connect to a user's main mailbox. Beneath this abstraction, support for alternate mailboxes is implemented as a folder hierarchy contained within the user's own mailbox or another physical mailbox. The architecture uses a sub-mailbox folder hierarchy to virtualize a separate physical mailbox. On top of this basic infrastructure, other features can be built such as server-hosted e-mail archives and mailboxes mirrored from other e-mail and PIM data systems. In support thereof, a mechanism is provided for an abstraction layer to expose all or a subset of the alternate mailbox features, and to advertise which alternate mailbox features are supported per alternate mailbox.

20 Claims, 10 Drawing Sheets

OTHER PUBLICATIONS

Microsoft Support, "How to Find Mail/Mailbox-Enabled Users in the Active Directory", Article ID: 252650, Revision 4.1, last reviewed Oct. 25, 2006, pp. 2-3.*

"Microsoft TechNet", "Understanding Public Folder Replication", retrieved at <<http://technet.microsoft.com/en-us/library/bb629523.aspx>>, Jul. 14, 2008.

Liccione, John, "Take Your Mailboxes to the Cloud and Back with MailShadow for Exchange Online", White Paper, retrieved at <<http://www.cemaphore.com/downloads/MSXWhitePaper.pdf>>, Nov. 17, 2008, pp. 1-9.

"Exchange Server 5.5 Resource Guide: Part 12—Public Folders", retrieved at <<https://www.microsoft.com/technet/archive/exchangeserver55/reskit/exc11.mspx?mfr=true>>, Jan. 5, 2009.

"Microsoft Office Online", "Copy the Outlook Folder Structure to another Computer", retrieved at <<http://office.microsoft.com/en-us/outlook/HA011166031033.aspx>>, Jan. 5, 2009.

"Infinite Ink", "Imap Service Providers a Step in Dealing with Viruses, Spam, and Email Overload", retrieved at <<http://www.ii.com/internet/messaging/imap/isps/"">, Sep. 1, 2007.

* cited by examiner

SUB-MAILBOX FOLDER HIERARCHY TO REPRESENT A SEPARATE PHYSICAL MAILBOX TO A USER

BACKGROUND

User devices can now provide multiple ways for users to communicate to one another. For example, cell phones and computers provide the principal means for communicating with other users, and each can be associated with message accounts. Moreover, users are now able to freely create message accounts such as for e-mail and text messaging via websites. Thus, users may have multiple accounts via which to send and receive information. However, having multiple accounts spread across various locations, websites, and clients, for example, introduces new problems with communications technologies that originally facilitate more efficient and effective communications.

Moreover, the capability to store substantially all messages can impose significant burden on client machines, thereby driving a need to store such messages off the client and on servers. However, again, storing different accounts and account messages across different locations is a suboptimal solution to an increasingly mobile society and to system resources.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides an abstraction of a mailbox store that allows clients to connect to multiple "alternate" mailboxes associated with a single user, exposing the same mechanism used to connect to a user's primary (or "main") mailbox. Beneath this abstraction, support for alternate mailboxes is implemented as a folder hierarchy contained within the user's own physical mailbox or another physical mailbox. The physical mailbox is the server location where messages are stored until retrieved by a suitable client. The architecture uses a sub-mailbox folder hierarchy to virtualize a separate physical mailbox. In other words, a physical mailbox of the user stored at a different storage location can be relocated to the local storage system as a subfolder hierarchy to the local physical mailbox. On top of this basic infrastructure, other features can be built such as server-hosted e-mail archives and mailboxes mirrored from other e-mail and PIM data systems. In support thereof, a mechanism is provided for an abstraction layer to expose all or a subset of the alternate mailbox features, and to advertise which alternate mailbox features are supported per alternate mailbox.

Clients can be agnostic to this architecture, by enabling the clients to logon to alternate mailboxes using the same mechanism used to logon to the user's primary mailbox, as though the alternate mailboxes were actually separate mailboxes. The alternate mailboxes can support all or a subset of mailbox features, and a mechanism is provided for the alternate mailboxes to advertise the mailbox features supported.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
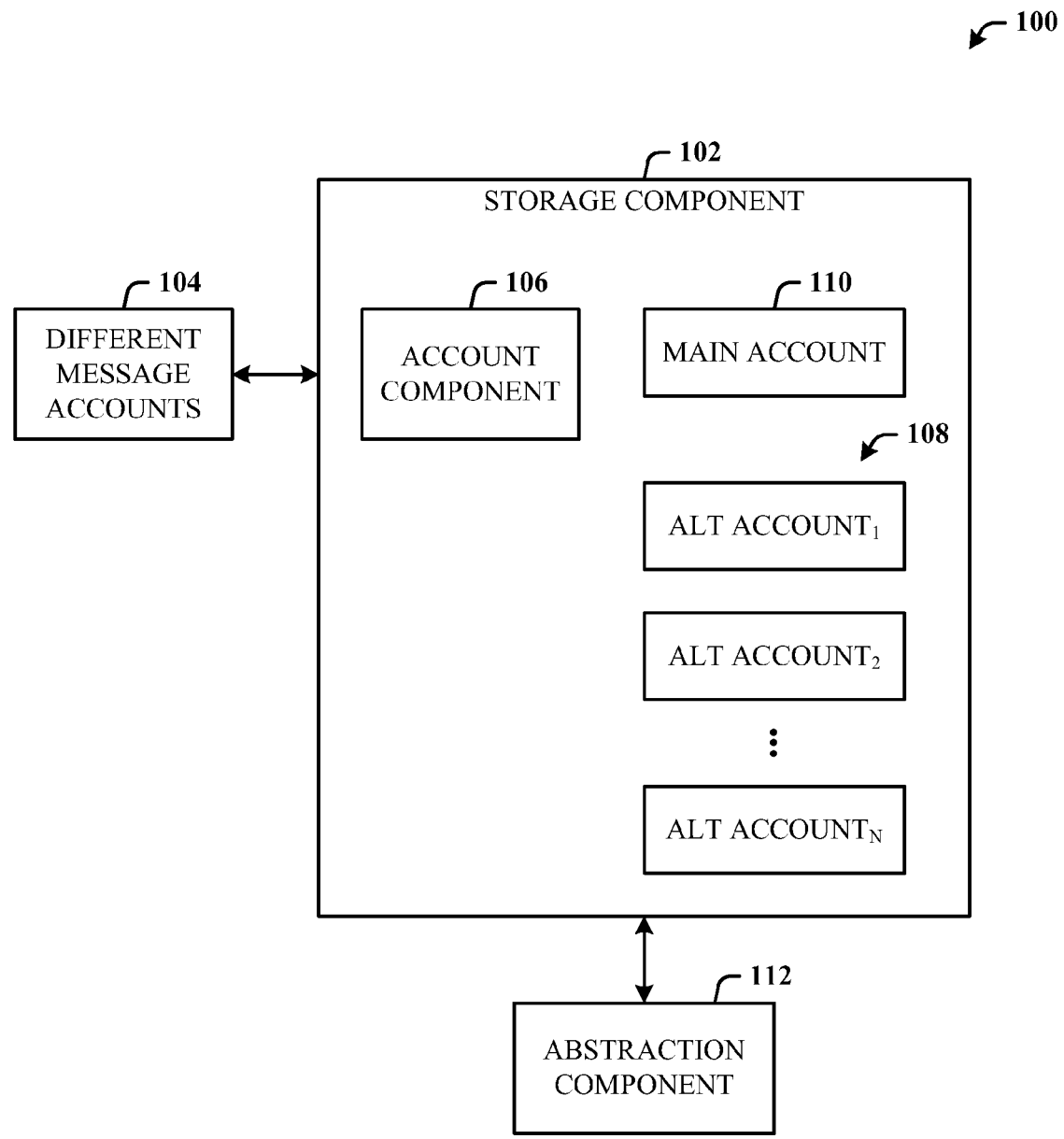
FIG. 1 illustrates a computer-implemented message system in accordance with the disclosed architecture.

The need to associate more than one physical store for a mailbox belonging to a user in an e-mail environment can manifest itself in several ways. One such way enables user-accessible archives of e-mail and PIM (personal information management) data to be stored on a server, which were previously stored on the client machine of the end user. An archive is associated with the user's main mailbox account, supports backward compatibility for alternate-mailbox-agnostic clients, and advertises the mailbox features it supports.

Another way allows users to mirror content from e-mail and PIM data accounts on other messaging and PIM systems to a centralized, hosted e-mail server. To avoid "bleeding" of personal e-mail data between personal e-mail and work e-mail, a separate mailbox can be provided on the e-mail centralized server for each remote account that is being mirrored. For purposes of backward compatibility, there is a strong desire to provide this functionality with minimal (if any) changes to the clients accessing the e-mail server.

The disclosed architecture provides an abstraction of a mailbox store that allows clients to connect to multiple "alternate" mailboxes associated with a single user, exposing the same mechanism used to connect to a user's primary physical mailbox. Beneath this abstraction, support for alternate mailboxes is implemented as a hidden folder hierarchy contained within a hidden portion or location of the user's local physical mailbox or another physical mailbox.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented message system 100 in accordance with the disclosed architecture. The system 100 includes a storage component 102 centrally located for storing representations of different message accounts 104 of a user, and an account component 106 of the storage component 102 for structuring the representations as alternate subaccounts 108 (denoted Alt Account$_1$, . . . ,Alt Account$_N$) to a main account 110.

The account component 106 structures the alternate subaccounts 108 as hidden relative to the main account 110, which is visible. The alternate subaccounts 108 are mailboxes of e-mail accounts of the user of other user mailbox locations. The alternate subaccounts 108 can include archive subaccounts and mirror subaccounts. The alternate subaccounts 108 are accessed via the main account 110. Alternatively, the alternate subaccounts 108 are subordinate to a physical account other than the main account 110. The alternate subaccounts 108 include physical mailboxes of the different message accounts 104 that are structured as hidden subaccounts in a hidden location of the main account 110. The system 100 can further comprise an abstraction component 112 for providing access to message data of the main account 110 and alternate subaccounts 108.

The storage component 102 can be a middle-tier (mid-tier) storage system, for example. The abstraction component 112 provides direct access by the user to one or more of the alternate subaccounts 108, and facilitates client agnostic access to the message data of the main account 110 as well as the alternate accounts 108. In other words, the client can be one of many different types of clients such as e-mail clients, PIM clients, etc., yet still access the message data in the accounts.

Figure 2:
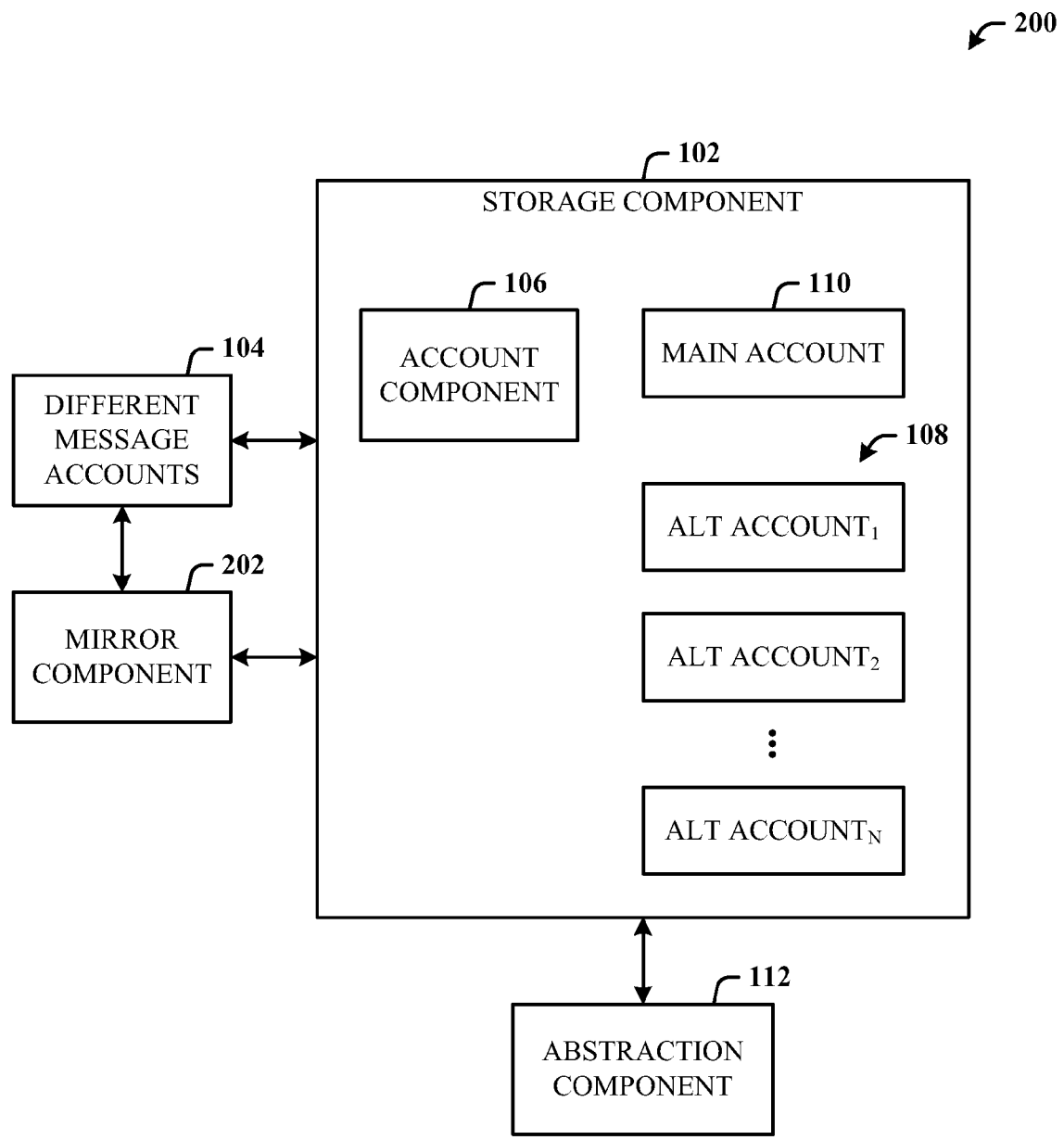
FIG. 2 illustrates an alternative embodiment of the message system that further includes a mirror component for mirroring content from the different message accounts to one or more of the alternate accounts.

FIG. 2 illustrates an alternative embodiment of the message system 200 that further includes a mirror component 202 for mirroring content from the different message accounts 104 to one or more of the alternate accounts 108. In other words, the different message accounts 104 can exist separately at different remote locations relative to the location of the storage component 102. The different message accounts 104 can include a client-based e-mail account, web-based accounts, information associated with a client-based PIM application, server-based messaging account, and so on.

The alternate accounts 108 can comprise mirrored accounts of the different message accounts 104 associated with correspondingly different e-mail systems. The alternate accounts 108 can also include archives of the different message accounts 104, as desired. The mirror component 202 can be configured to periodically reach out (access) to each of the different message accounts 104 and pull the associated messaging data into the mirrored accounts in the storage component 102.

As before, the abstraction component 112 facilitates access to the alternate accounts 108 via the main account 110 (mailbox). Each of the alternate accounts 108 can advertise all or a subset of account features in response to access to the corresponding alternate account. Additionally, the storage component 102 can include a user object of the main account 110 that is extended to include a list of the associated alternate accounts 108.

Put another way, the computer-implemented message system 200 includes the storage component 102 centrally located for storing representations of the different message accounts 104 of a user, the account component 106 of the storage component 102 for structuring the representations as the alternate subaccounts 108 to the main account 110, the mirror component 202 for mirroring content from the different message accounts 104 to the main account 110 and alternate subaccounts 108, and the abstraction component 112 for providing access to the message data of the main account 110 and alternate subaccounts 108.

The account component 106 structures the alternate subaccounts 108 as subordinate and hidden relative to the main account 110, which main account 110 is visible and via which access to the alternate subaccounts 108 is provided. The alternate subaccounts 108 are hidden accounts that include message data and PIM data of archive subaccounts and mirror subaccounts of the different message accounts 104. The main account 110 includes a list of the alternate subaccounts 108, and the alternate subaccounts 108 are accessed via the main account 110 based on the list.

The archive accounts store archives of the e-mail data and PIM data of the main account 110. In an alternative embodiment, the archive accounts can store archives for the mirrored accounts as well. The alternate accounts 108 advertise all or a subset of account features that the alternate (mailbox) accounts 108 support. The account features can be enabled or disabled based on capabilities flags. The alternate accounts 108 are accessible via the same session interface employed to access the main account 110.

Figure 3:
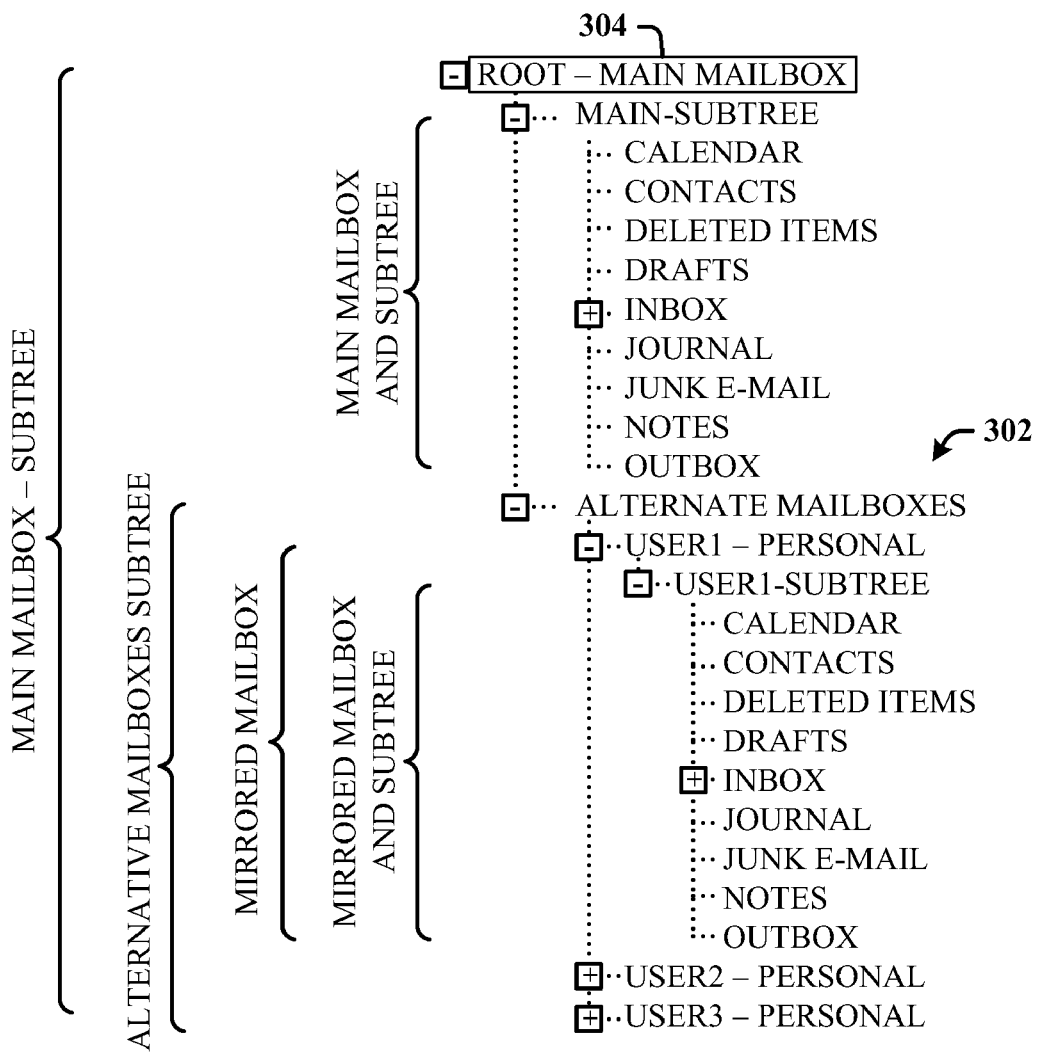
FIG. 3 illustrates an exemplary mailbox account folder hierarchy that represents three logical alternate mailbox subaccounts.

FIG. 3 illustrates an exemplary mailbox account folder hierarchy 300 that represents three logical alternate mailbox subaccounts 302. In most e-mail systems, user mailboxes are designed such that some mailbox content, which is used internally by the system, is intended to be hidden from users. This content resides in a particular section of the folder hierarchy within a mailbox, separate from the user-visible root main mailbox 304. E-mail clients respect this designation by convention, and display a folder hierarchy that emanates from the main mailbox 304. The disclosed architecture leverages this convention to introduce the notion of sub-mailboxes (or subfolders), which are folder hierarchies rooted within the hidden section of the main mailbox 304.

Here, the hierarchy 300 shows the main mailbox 304 as the root with three sub-mailboxes in the hidden subtree of the main mailbox 304. In this example, the visible part of the main mailbox 304 is the content that appears under a node labeled "MAIN-SUBTREE". The user's three physical mailboxes (from the different message accounts 104 of FIG. 1) appear as alternate mailbox subaccounts under an ALTERNATE MAILBOXES node, also referred to as the alternate mailbox subaccounts 302, which is in the hidden subtree of the main mailbox 304. A first alternate mailbox (denoted USER1-PERSONAL) of the "virtualized" mailboxes is shown expanded, with a set of e-mail folders (e.g., Calendar, Contacts, Deleted Items, Drafts, Inbox, Journal, Junk Mail, Notes, Outbox, etc.) in its subtree. The second and third alternate mailbox (denoted USER2-PERSONAL and USER3-PERSONAL) of the virtualized mailboxes are shown collapsed, but can be web-mail accounts or archives, for example.

Note that while this example shows the hierarchy of the alternate mailbox subaccounts 302 contained within a hidden part of the user's own main mailbox, a sub-mailbox folder hierarchy of some other physical mailbox on the system can be used for the same purpose.

Because the user's main mailbox and virtualized alternate mailboxes can reside on the same physical storage, it can be guaranteed that the availability characteristics for all of the user mailboxes are the same. This helps to alleviate user interface difficulties that can occur by associating multiple mailboxes with the same user that reside on separate physical stores.

As illustrated, the main mailbox subtree, in this example, is defined from the Main-Subtree node to the Outbox node. An example of a mirrored mailbox and subtree is shown with respect to the first alternate subaccount (User1-Personal) as including the User1-Subtree to the Outbox. A mirrored mailbox is defined as extending from the User1-Personal node to the Outbox. The alternate mailboxes subtree is defined as extending from the Alternate Mailboxes node to and including the User3-Personal alternate mailbox. The main mailbox subtree is defined as extending from the Main Mailbox node to the User3-Personal alternate mailbox subaccount.

Figure 4:
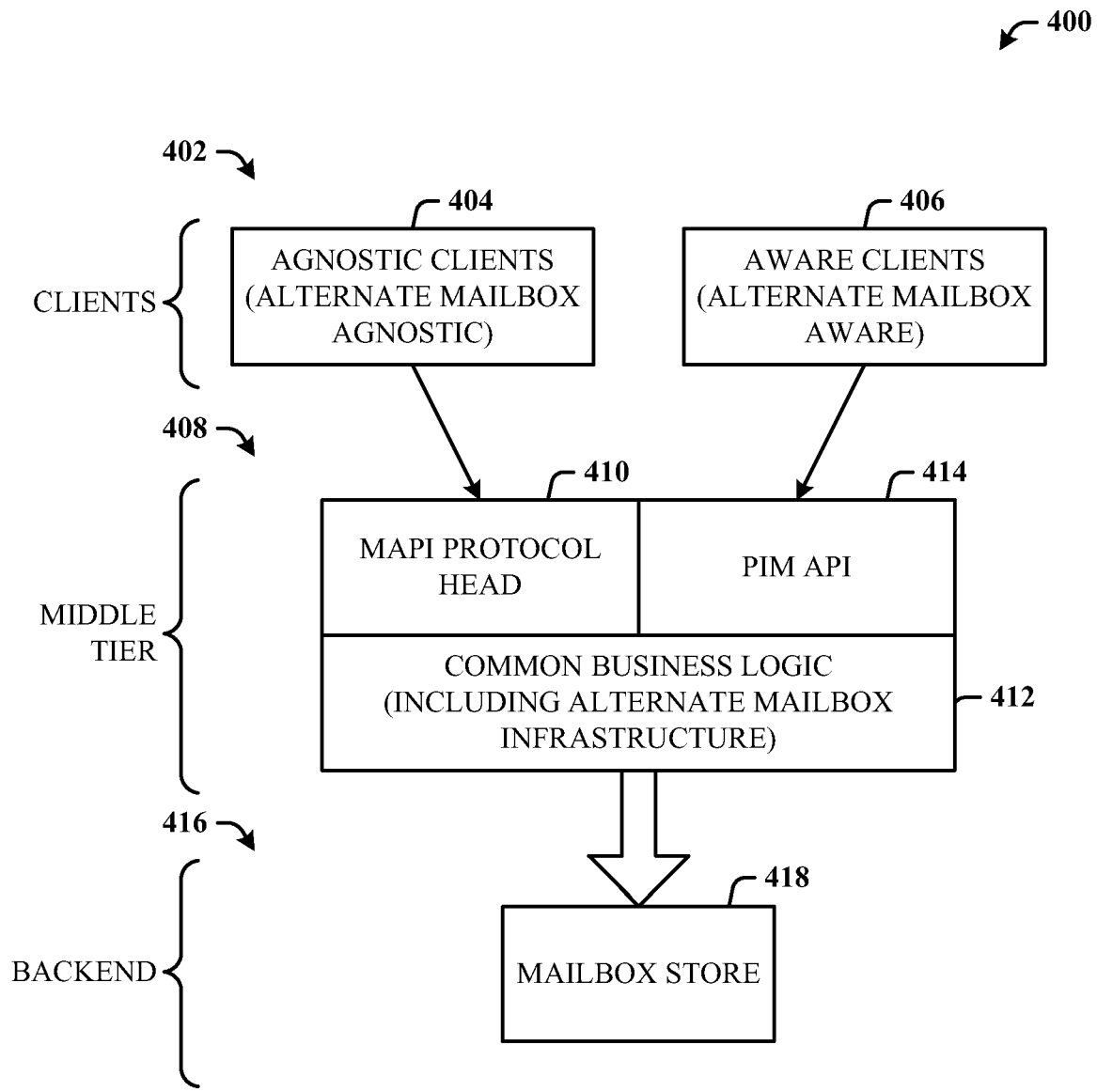
FIG. 4 illustrates an alternate mailbox multi-tier infrastructure for associating multiple mailboxes with a single user.

FIG. 4 illustrates an alternate mailbox multi-tier infrastructure 400 for associating multiple mailboxes with a single user. A client tier 402 includes agnostic clients 404 that are agnostic to the alternate mailboxes, and aware clients 406 that are aware (have the technical capabilities to interact) of the alternate mailboxes. The mid-tier 408 includes a MAPI (messaging application programming interface) protocol head 410 for interfacing the agnostic clients 404 to underlying business logic 412 and a PIM API 414 for interfacing the aware clients 406 to the business logic 412. The business logic 412 can also include the alternate mailbox infrastructure. The business logic 412 interfaces to a backend tier 416 that includes a mailbox store 418.

Figure 5:
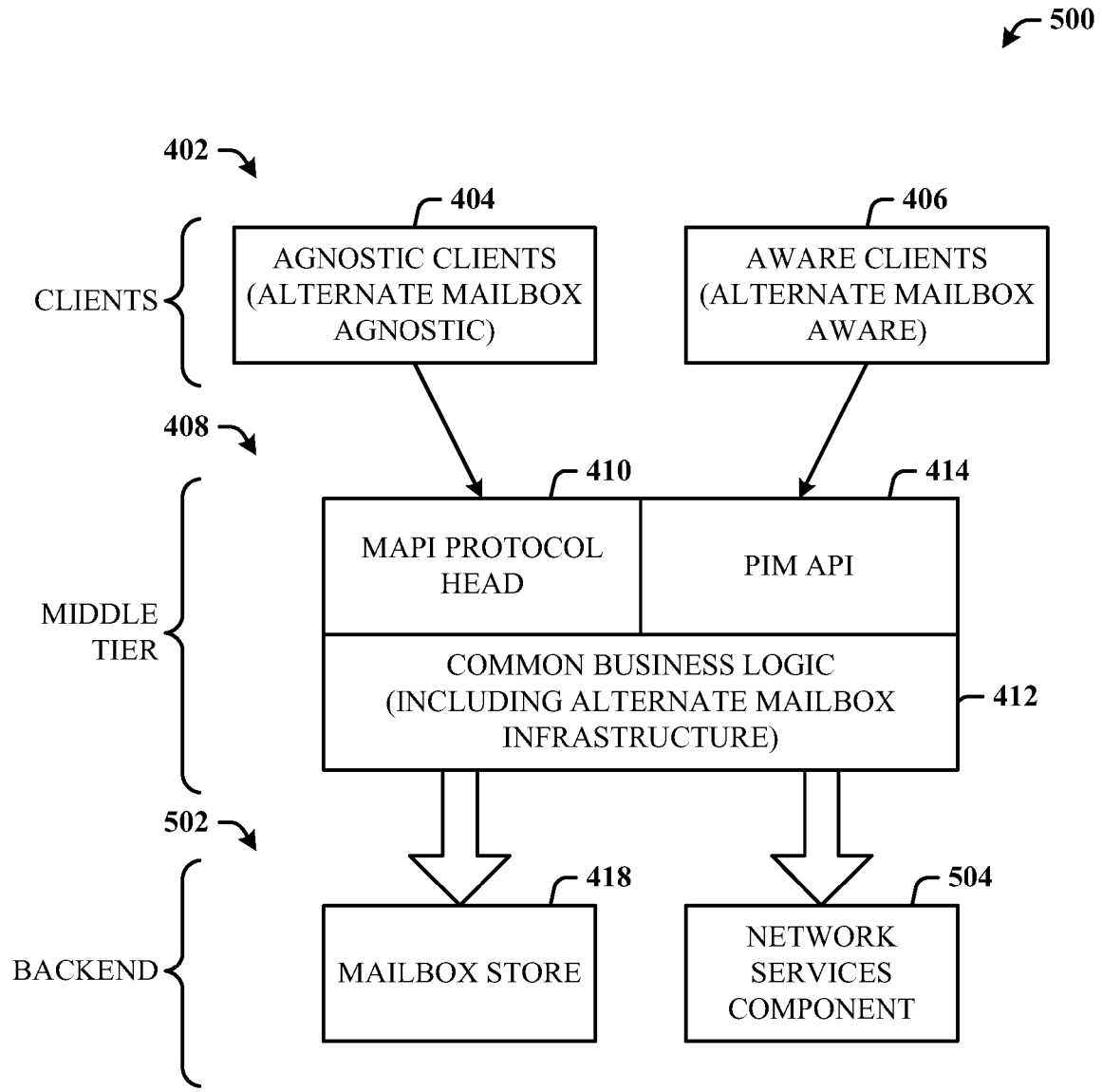
FIG. 5 illustrates an alternate mailbox multi-tier infrastructure for associating multiple mailboxes with a single user that employs directory services.

FIG. 5 illustrates an alternate mailbox multi-tier infrastructure 500 for associating multiple mailboxes with a single user that employs directory services. The client tier 402 includes the agnostic clients 404 that are agnostic to the alternate mailboxes, and the aware clients 406 that are aware of the alternate mailboxes. The mid-tier 408 also includes the MAPI protocol head 410 for interfacing the agnostic clients 404 to the underlying business logic 412 and the PIM API 414 for interfacing the aware clients 406 to the business logic 412. The business logic 412 can also include the alternate mailbox infrastructure. The business logic 412 interfaces to a backend tier 502 that not only includes the mailbox store 418, but also a directory services component 504 (also referred to as a network services component 504). The network services component 504 stores information about network resources such as user accounts, for example.

Because alternate mailboxes are associated with a single main mailbox, the alternate mailboxes do not need the added management burden of being exposed (e.g., in a directory) as a new kind of mailbox-enabled user object, but can instead be represented as an association of attributes on a single user object. The user object can be used to represent a mailbox, and includes attributes such as the mailbox distinguished name and home mailbox database GUID (globally unique identifier). To support alternate mailboxes, the user object can be extended to include a list of the associated alternate mailboxes. The entries encoded in this list include data such as the mailbox GUID, home mailbox database, display name, SMTP (simple mail transfer protocol) address, mailbox quota, and mailbox type (e.g., archive, mirror, etc.).

For example, a user object with a primary mailbox on company.com (user1@company.com) and two alternate mailboxes can have the following data in an alternate mailboxes list:

| ID | HomeMdb | DisplayName | SmtpAddress | Quota | Flags |
|---|---|---|---|---|---|
| {Guid1} | {homeMdbGuid} | Annual Archive | (null) | Unlimited | Archive |
| {Guid2} | {homeMdbGuid} | User 1 Mirrored Mailbox | user1@e-mail.com | 1 GB | Mirror |

To connect to a sub-mailbox, a client uses the same mailbox session API that is used to connect to the main mailbox. This API accepts the distinguished name (DN) or e-mail address of the mailbox to open, recognizes the DN or e-mail address of an alternate sub-mailbox, and directs the client to the appropriate sub-mailbox hierarchy.

For clients that are agnostic to the alternate mailbox architecture, a user profile is created (e.g., manually or through a discovery mechanism) that stores this DN. Clients that are alternate mailbox-aware can check the directory at runtime for the set of alternate mailboxes associated with a user, rather than storing the DN. Once the client has connected to the alternate mailbox, the client interacts with the mailbox as it would any other mailbox.

The two scenarios driving alternate mailbox support in mailbox servers (e.g., mailbox archiving and mailbox mirroring) place different requirements on the functionality that the mailbox exposes. For archive mailboxes, certain actions (e.g., send, deliver) and settings (e.g., out-of-office, rules) are only relevant for a user's primary mailbox. Thus, these actions and settings can be disabled for the alternate mailbox. For mirrored mailboxes, however, all mailbox features and settings can be fully enabled on all of this type of alternate mailbox.

To support these two scenarios (and provide expansion to other alternate mailbox types), a mechanism is provided to turn mailbox features on or off, based on a set of "Capabilities" flags. This mechanism also enables the mailbox session to advertise to clients which features the mailbox supports. Alternate mailbox-aware clients can use this data to turn user interface elements on or off, for example, depending on the capabilities of the session.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
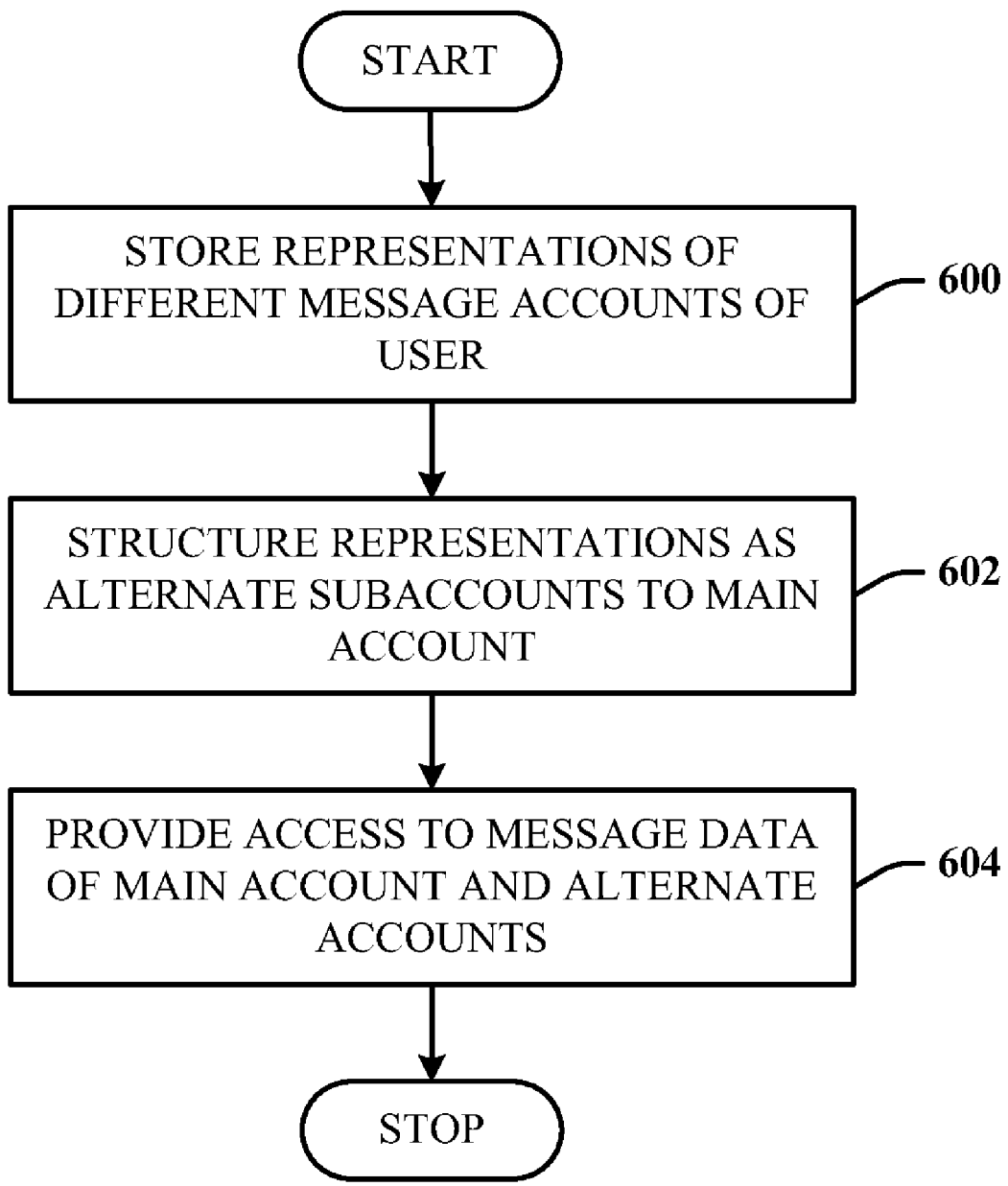
FIG. 6 illustrates a messaging method that employs a mailbox subaccount hierarchy.

FIG. 6 illustrates a messaging method that employs a mailbox subaccount hierarchy. At 600, representations of different message accounts of a user are stored centrally. At 602, the representations are structured as alternate subaccounts to a main account. At 604, access to the message data of the main account and alternate subaccounts is provided.

Figure 7:
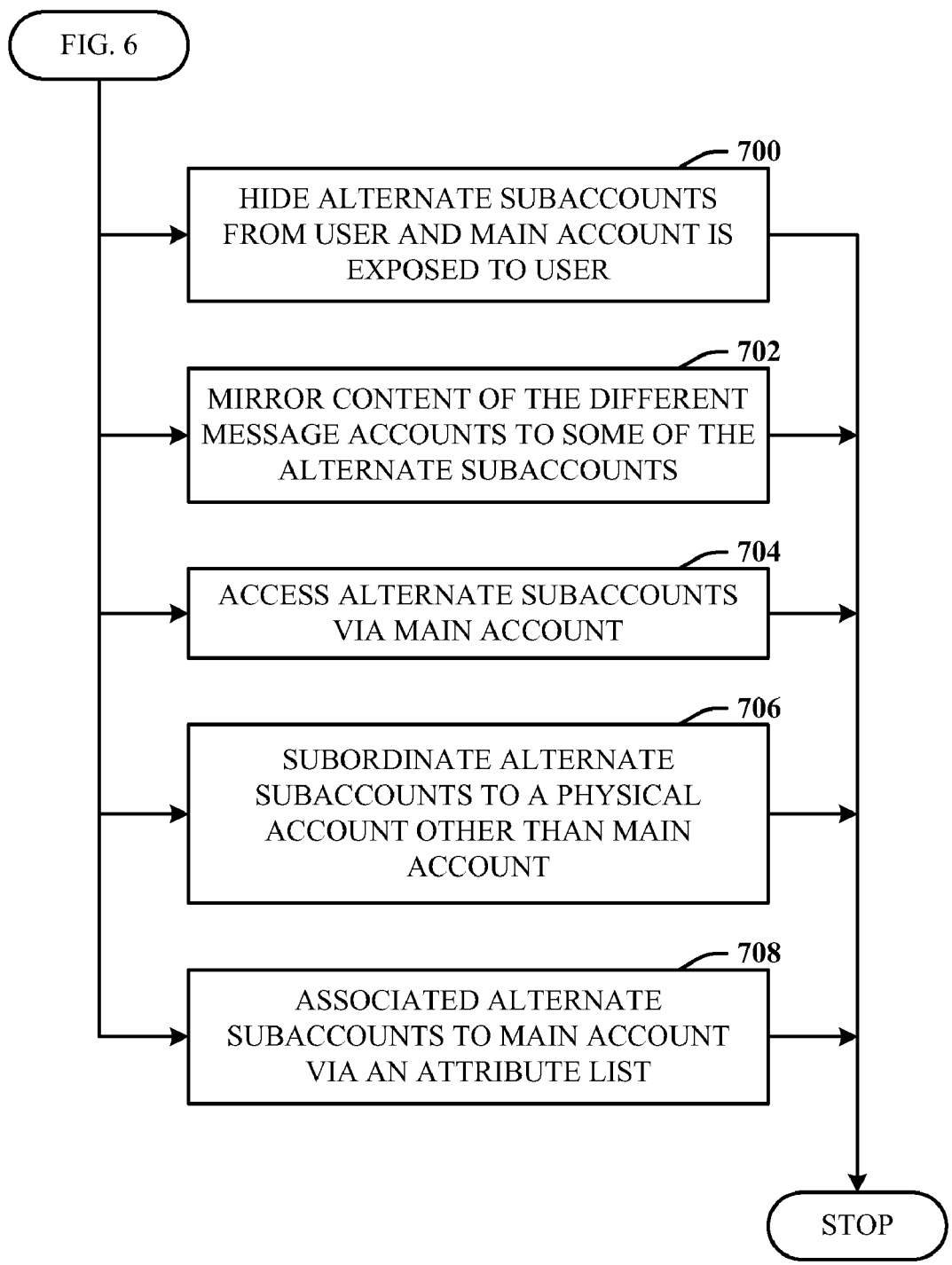
FIG. 7 illustrates alternative aspects for the messaging method of FIG. 6.

FIG. 7 illustrates alternative aspects for the messaging method of FIG. 6. At 700, the alternate subaccounts are hidden from the user and the main account is exposed to the user. At 702, content of the different message accounts is mirrored to some of the alternate subaccounts. The mirrored content includes message content and PIM content of the different message accounts. At 704, the alternate subaccounts can be accessed via the main account. At 706, the alternate subaccounts are subordinated to a physical account other than the main account. At 708, the alternate subaccounts are associated to the main account via an attribute list.

Figure 8:
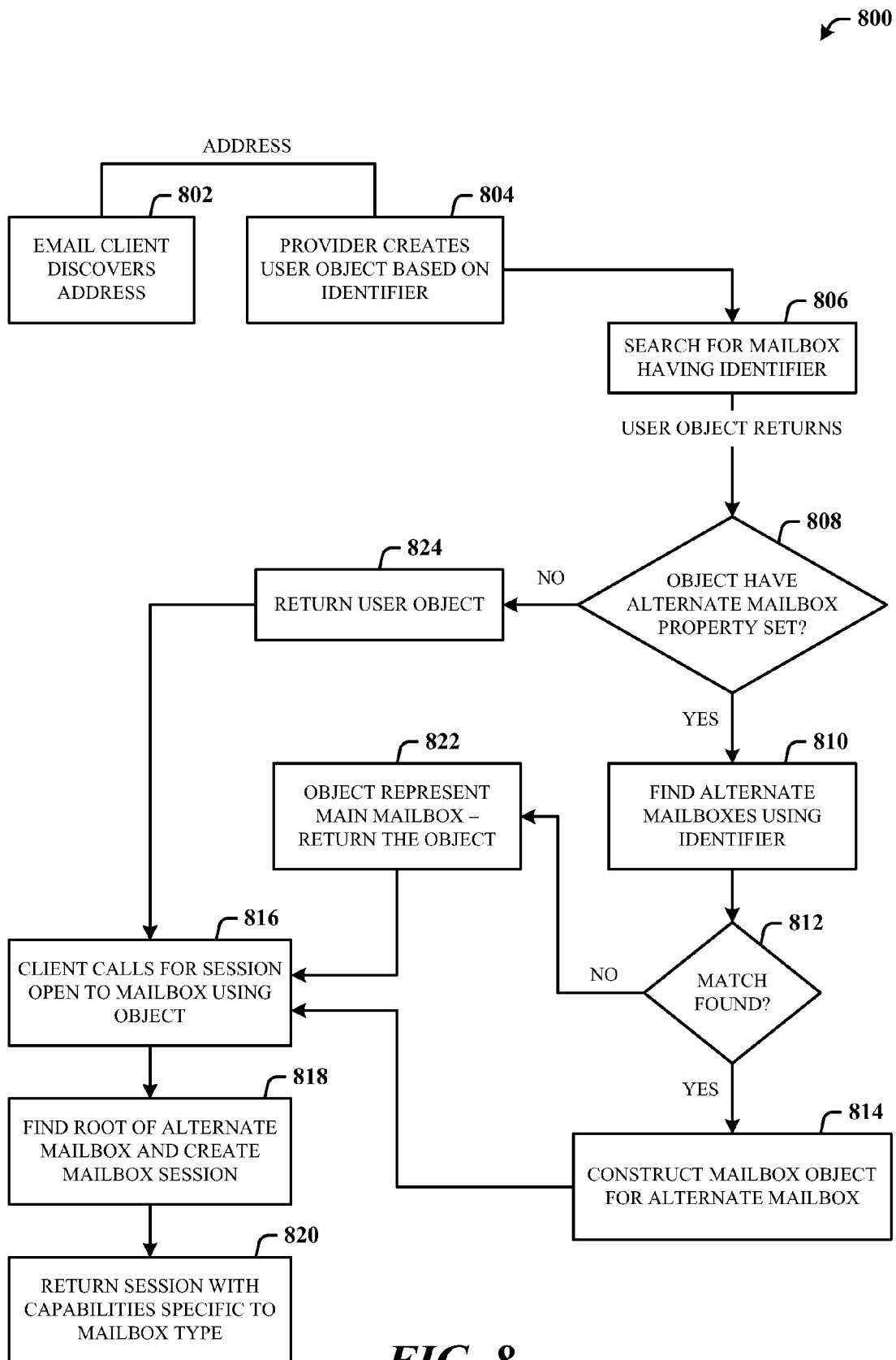
FIG. 8 illustrates a detailed flow in the middle-tier of managing data of multiple mailbox accounts at a central location.

FIG. 8 illustrates a detailed flow 800 in the middle-tier of managing data of multiple mailbox accounts at a central location. The flow diagram describes flow from when a client is connecting to an alternate mailbox and the middle-tier logic, and finding the correct mailbox to connect to. At 802, an e-mail client automatically discovers the address (e.g., HTTP). However, the client has an identifier of a mailbox to which to connect, and attempts to connect to the mailbox based on the identifier. At 804, a mid-tier provider creates a user object that represents the mailbox based on the identifier of the client. At 806, a search is made in the storage for a mailbox having the identifier. At 808, if the mailbox exists, flow is to 810 to find the alternate mailboxes associated with the main mailbox. At 812, if a match is found, flow is to 814 to construct another representation of a mailbox object for that alternate mailbox. Flow is then to 816 where the client calls for a session to open for the mailbox (in this case, an alternate mailbox). At 818, the root of an alternate mailbox is found and a mailbox session is created that is rooted there. At 820, the session is returned back to the client with capabilities specific to the mailbox.

At 812, if a match is not found, flow is to 822, where the client is looking at the main mailbox and the object is returned to 816. If, at 808, there the object does not have the alternate mailbox property set, flow is to 824 to return the user object to 816.

In this case, the client can be the MAPI protocol head 410 of FIG. 4. The client can discover the alternate mailboxes via the main mailbox. In one alternative implementation, the client can discover the mirrored mailboxes directly without going through the main mailbox.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
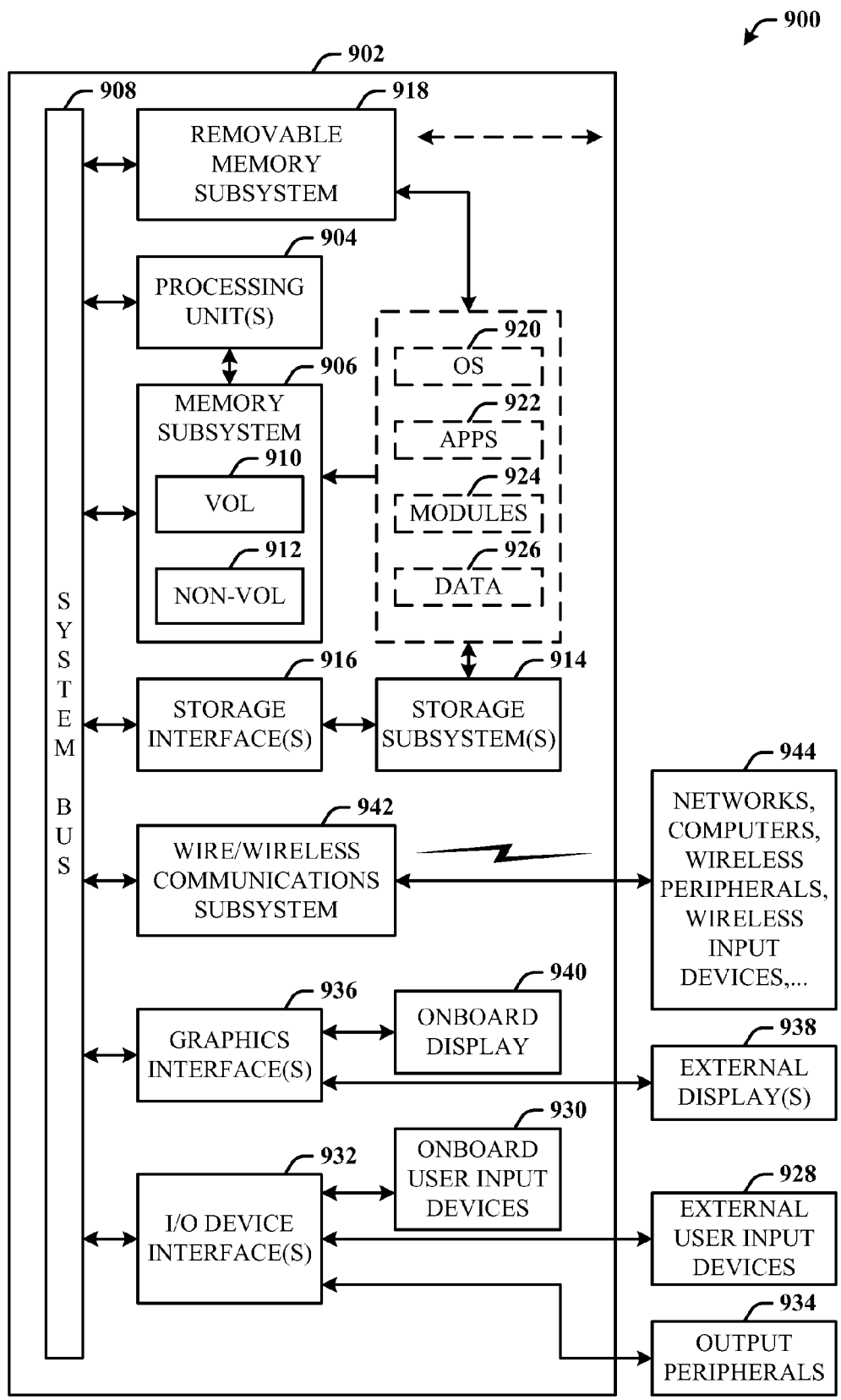
FIG. 9 illustrates a block diagram of a computing system operable to support the disclosed alternate mailbox infrastructure in accordance with the disclosed architecture.

Referring now to FIG. 9, there is illustrated a block diagram of a computing system 900 operable to support the disclosed alternate mailbox infrastructure in accordance with the disclosed architecture. In order to provide additional context for various aspects thereof, FIG. 9 and the following discussion are intended to provide a brief, general description of the suitable computing system 900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 900 for implementing various aspects includes the computer 902 having processing unit(s) 904, a system memory 906, and a system bus 908. The processing unit(s) 904 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 906 can include volatile (VOL) memory 910 (e.g., random access memory (RAM)) and non-volatile memory (NON-VOL) 912 (e.g., ROM, EPROM, EEPROM, etc.). A basic input/output system (BIOS) can be stored in the non-volatile memory 912, and includes the basic routines that facilitate the communication of data and signals between components within the computer 902, such as during startup. The volatile memory 910 can also include a high-speed RAM such as static RAM for caching data.

The system bus 908 provides an interface for system components including, but not limited to, the memory subsystem 906 to the processing unit(s) 904. The system bus 908 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 902 further includes storage subsystem(s) 914 and storage interface(s) 916 for interfacing the storage subsystem(s) 914 to the system bus 908 and other desired computer components. The storage subsystem(s) 914 can include one or more of a hard disk drive (HDD), a magnetic floppy disk drive (FDD), and/or optical disk storage drive (e.g., a CD-ROM drive DVD drive), for example. The storage interface(s) 916 can include interface technologies such as EIDE, ATA, SATA, and IEEE 1394, for example.

One or more programs and data can be stored in the memory subsystem 906, a removable memory subsystem 918 (e.g., flash drive form factor technology), and/or the storage subsystem(s) 914, including an operating system 920, one or more application programs 922, other program modules 924, and program data 926. Generally, programs include routines, methods, data structures, other software components, etc., that perform particular tasks or implement particular abstract data types.

The one or more application programs 922, other program modules 924, and program data 926 can include the components and entities of the system 100 of FIG. 1, the components and entities of the system 200 of FIG. 2, the hierarchy 300 of FIG. 3, the components and entities of the infrastructure 400 of FIG. 4 and infrastructure 500 of FIG. 5, and the flow charts and diagrams of FIGS. 6-8, for example.

All or portions of the operating system 920, applications 922, modules 924, and/or data 926 can also be cached in memory such as the volatile memory 910, for example. It is to be appreciated that the disclosed architecture can be implemented with various commercially available operating systems or combinations of operating systems (e.g., as virtual machines).

The storage subsystem(s) 914 and memory subsystems (906 and 918) serve as computer readable media for volatile and non-volatile storage of data, data structures, computer-executable instructions, and so forth. Computer readable media can be any available media that can be accessed by the computer 902 and includes volatile and non-volatile media, removable and non-removable media. For the computer 902, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 902, programs, and data using external user input devices 928 such as a keyboard and a mouse. Other external user input devices 928 can include a microphone, an IR (infrared) remote control, a joystick, a game pad, camera recognition systems, a stylus pen, touch screen, gesture systems (e.g., eye movement, head movement, etc.), and/or the like. The user can interact with the computer 902, programs, and data using onboard user input devices 930 such a touchpad, microphone, keyboard, etc., where the computer 902 is a portable computer, for example. These and other input devices are connected to the processing unit(s) 904 through input/output (I/O) device interface(s) 932 via the system bus 908, but can be connected by other interfaces such as a parallel port, IEEE 1394 serial port, a game port, a USB port, an IR interface, etc. The I/O device interface(s) 932 also facilitate the use of output peripherals 934 such as printers, audio devices, camera devices, and so on, such as a sound card and/or onboard audio processing capability.

One or more graphics interface(s) 936 (also commonly referred to as a graphics processing unit (GPU)) provide graphics and video signals between the computer 902 and external display(s) 938 (e.g., LCD, plasma) and/or onboard displays 940 (e.g., for portable computer). The graphics interface(s) 936 can also be manufactured as part of the computer system board.

The computer 902 can operate in a networked environment (e.g., IP) using logical connections via a wired/wireless communications subsystem 942 to one or more networks and/or other computers. The other computers can include workstations, servers, routers, personal computers, microprocessor-based entertainment appliance, a peer device or other common network node, and typically include many or all of the elements described relative to the computer 902. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 902 connects to the network via a wired/wireless communication subsystem 942 (e.g., a network interface adapter, onboard transceiver subsystem, etc.) to communicate with wired/wireless networks, wired/wireless printers, wired/wireless input devices 944, and so on. The computer 902 can include a modem or has other means for establishing communications over the network. In a networked environment, programs and data relative to the computer 902 can be stored in the remote memory/storage device, as is associated with a distributed system. It will be appreciated that the network connections shown are exemplary and other means of establishing a communications link between the computers can be used.

The computer 902 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 10:
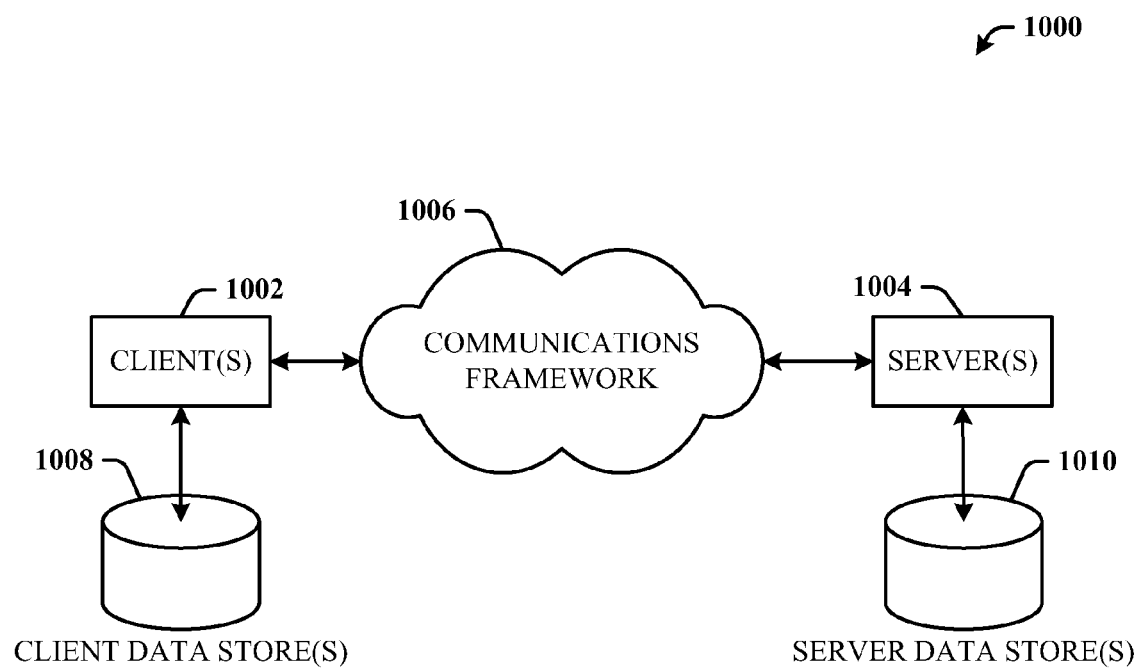
FIG. 10 illustrates a schematic block diagram of a computing environment that supports mid-tier alternate mailboxes in a hidden subfolder tree.

Referring now to FIG. 10, there is illustrated a schematic block diagram of a computing environment 1000 that supports mid-tier alternate mailboxes in a hidden subfolder tree. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented message system, comprising:
a storage component that provides a location for storing representations of different message accounts and respective electronic mail (email) of a user;
an account component of the storage component for structuring the representations of the different message accounts as alternate subaccounts to a main account, implemented as a folder hierarchy contained within a physical mailbox of the user;
an abstraction component for providing access to email of the main account and alternate subaccounts, wherein a mailbox-enabled user object to access email of the main account is utilized to access email of the alternate subaccounts via an association of attributes representing the alternate subaccounts; and
a processor that executes computer-executable instructions associated with at least one of the storage component, account component, or abstraction component.

2. The system of claim 1, wherein the account component structures the alternate subaccounts as hidden relative to the main account, which is visible.

3. The system of claim 1, wherein the alternate subaccounts are copies of other user physical mailboxes.

4. The system of claim 1, wherein the alternate subaccounts include archive subaccounts and mirror subaccounts.

5. The system of claim 1, wherein the alternate subaccounts are accessed via the main account.

6. The system of claim 1, wherein the alternate subaccounts are subordinate to a physical account other than the main account.

7. The system of claim 1, wherein the alternate subaccounts include content mirrored from the different message accounts that are structured as hidden subaccounts to the main account.

8. The system of claim 1, further comprising a mirror component that mirrors content from the different message accounts to the alternate subaccounts.

9. The system of claim 8, wherein the mirror component mirrors message content and PIM (personal information management) content of the different message accounts to the alternate subaccounts.

10. A computer-implemented message system, comprising:
a storage component providing a central location for storing representations of different message accounts and respective email of a user;
an account component of the storage component for structuring the representations of the different message accounts as alternate subaccounts to a main account implemented as a folder hierarchy contained within a physical mailbox of the user;
a mirror component for mirroring content from the different message accounts to the main account and alternate subaccounts;
an abstraction component for providing access to email of the main account and alternate subaccounts, wherein a mailbox-enabled user object to access email of the main account is utilized to access email of the alternate subaccounts via an association of attributes representing the alternate subaccounts; and
a processor that executes computer-executable instructions associated with at least one of the storage component, account component, mirror component, or abstraction component.

11. The system of claim 10, wherein the account component structures the alternate subaccounts as subordinate and hidden relative to the main account, which main account is visible and via which access to the alternate subaccounts is provided.

12. The system of claim 10, wherein the alternate subaccounts are hidden accounts that include message data and PIM data of archive subaccounts and mirror subaccounts of the different message accounts.

13. The system of claim 10, wherein the main account includes a list of the alternate subaccounts, and the alternate subaccounts are accessed via the main account based on the list.

14. A computer-implemented messaging method, comprising acts of:
storing representations of different message accounts and respective email of a user;
structuring the representations of the different message accounts as alternate subaccounts to a main account by implementing a folder hierarchy contained within a physical mailbox of the user;
providing access to email of the main account and alternate subaccounts;
utilizing a mailbox-enabled user object to access email of the main account and to access email of alternate subaccounts via an association of attributes representing the alternate subaccounts; and
utilizing a processor that executes instructions stored in memory to perform at least one of the acts of storing, structuring, utilizing, or providing.

15. The method of claim 14, further comprising hiding the alternate subaccounts and exposing the main account.

16. The method of claim 14, further comprising mirroring content of the different message accounts to some of the alternate subaccounts.

17. The method of claim 16, wherein the mirrored content includes message content and PIM content of the different message accounts.

18. The method of claim 14, further comprising accessing the alternate subaccounts via the main account.

19. The method of claim 14, further comprising subordinating the alternate subaccounts to a physical account other than the main account.

20. The method of claim 14, further comprising associating the alternate subaccounts to the main account via an attribute list.

* * * * *